US009501685B2

(12) United States Patent
Bernstein et al.

(10) Patent No.: US 9,501,685 B2
(45) Date of Patent: Nov. 22, 2016

(54) INTEGRATED FINGER PRINT SENSOR (71) Applicant: IDEX ASA, Fornebu (NO)

(72) Inventors: Ralph W. Bernstein, Hosle (NO); Nicolai W. Christie, Hosle (NO); Geir Ivar Bredholt, Oslo (NO); Øyvind Sløgedal, Hosle (NO)

(73) Assignee: IDEX ASA, Fornebu (NO)

( * ) Notice: Subject to any disclaimer, the term of this patent is extended or adjusted under 35 U.S.C. 154(b) by 235 days.

(21) Appl. No.: 14/183,893

(22) Filed: Feb. 19, 2014

(65) Prior Publication Data
US 2014/0241595 A1    Aug. 28, 2014

(30) Foreign Application Priority Data

Feb. 22, 2013  (NO) .................................. 20130289
Oct. 28, 2013  (NO) .................................. 20131423

(51) Int. Cl.
*G06F 3/041*    (2006.01)
*G06K 9/00*    (2006.01)

(52) U.S. Cl.
CPC ......... *G06K 9/00013* (2013.01); *G06K 9/0002* (2013.01); *G06K 9/00053* (2013.01)

(58) Field of Classification Search
CPC .... G06F 21/32; G06F 3/0412; G06F 1/1626; G06F 1/1643; G06F 3/017; G06F 3/041; G06F 21/31; G06F 21/72; G06F 21/75; G06F 3/147; G06F 1/1613; G06F 1/169; G06F 3/044; G06F 15/0283; G06F 1/1632
USPC .......... 345/173, 174, 175, 169, 156
IPC .......... H04M 11/025, 1/0291, 1/7253, 1/72536, H04M 11/00, 19/048, 1/02, 1/0245, 1/0254, H04M 1/0268, 1/0274, 1/04, 1/22, 1/72519, H04M H04M 1/72533, 1/72575, 1/72577, H04M 2250/22
See application file for complete search history.

(56) References Cited

U.S. PATENT DOCUMENTS 4,016,490 A    4/1977  Weckenmann et al.
4,290,052 A    9/1981  Eichelberger et al.
(Continued)

FOREIGN PATENT DOCUMENTS

AU    2013100571 A4    4/2013
EP     0919947 A2    6/1996
(Continued)

OTHER PUBLICATIONS

International Search Report issued in International Patent Application No. PCT/EP2014/053427, 4 pages (Jun. 23, 2014).
(Continued)

*Primary Examiner* — Duc Dinh
(74) *Attorney, Agent, or Firm* — Rothwell, Figg, Ernst & Manbeck PC (57) ABSTRACT A fingerprint sensor and fingerprint sensor system especially for integration in a device having an overlay made of an insulating material comprises a plurality of sensing elements positioned on a first side of the overlay; a plurality of probes positioned in a predetermined pattern defining a fingerprint sensing area on a second side of the overlay, the plurality of probes extending from the first side of the overlay at least partially through the overlay; a plurality of conductor leads on the first side of the overlay interconnecting the plurality of probes with the plurality of sensing elements; a plurality of amplifiers connected to the plurality of sensing elements, the number of amplifiers being less than the number of sensing elements; and an activation circuit connected to the plurality of sensing elements, the activation circuit being adapted to output at least one activation signal.

25 Claims, 7 Drawing Sheets (56) References Cited

U.S. PATENT DOCUMENTS

| | | |
|---|---|---|
| 4,353,056 A | 10/1982 | Tsikos |
| 5,325,442 A | 6/1994 | Knapp |
| 5,371,404 A | 12/1994 | Juskey et al. |
| 5,399,898 A | 3/1995 | Rostoker |
| 5,509,083 A | 4/1996 | Abtahi et al. |
| 5,844,287 A | 12/1998 | Hassan et al. |
| 5,861,875 A | 1/1999 | Gerpheide |
| 5,862,248 A | 1/1999 | Salatino et al. |
| 5,953,441 A | 9/1999 | Setlak |
| 5,963,679 A | 10/1999 | Setlak |
| 6,016,355 A | 1/2000 | Dickinson et al. |
| 6,020,749 A | 2/2000 | Morris et al. |
| 6,025,726 A | 2/2000 | Gershenfeld et al. |
| 6,026,564 A | 2/2000 | Wang et al. |
| 6,069,970 A | 5/2000 | Salatino et al. |
| 6,289,114 B1 | 9/2001 | Mainguet |
| 6,327,376 B1 | 12/2001 | Harkin |
| 6,459,424 B1 | 10/2002 | Resman |
| 6,483,931 B2 | 11/2002 | Kalnitsky et al. |
| 6,512,381 B2 | 1/2003 | Kramer |
| 6,522,773 B1 | 2/2003 | Houdeau |
| 6,525,547 B2 | 2/2003 | Hayes |
| 6,636,053 B1 | 10/2003 | Gozzini |
| 6,714,666 B1 | 3/2004 | Morimura et al. |
| 6,737,329 B2 | 5/2004 | Lepert et al. |
| 6,765,274 B2 | 7/2004 | Honda |
| 6,785,407 B1 | 8/2004 | Tschudi et al. |
| 6,862,942 B2 | 3/2005 | Kawahata |
| 6,927,581 B2 | 8/2005 | Gozzini |
| 6,987,871 B2 | 1/2006 | Kalnitsky et al. |
| 7,053,633 B2 | 5/2006 | Hara |
| 7,081,765 B2 | 7/2006 | Miyasaka et al. |
| 7,084,642 B2 | 8/2006 | Gozzini |
| 7,088,114 B2 | 8/2006 | Gozzini |
| 7,251,351 B2 | 7/2007 | Mathiassen et al. |
| 7,298,875 B2 | 11/2007 | Kim et al. |
| 7,339,381 B2 | 3/2008 | Van Berkel |
| 7,522,753 B2 | 4/2009 | Kalnitsky et al. |
| 7,705,613 B2 | 4/2010 | Misra et al. |
| 7,738,681 B1 * | 6/2010 | Rannow ............... G06K 9/0002 382/124 |
| 7,848,550 B2 | 12/2010 | Mathiassen et al. |
| 7,940,249 B2 | 5/2011 | Perreault |
| 8,358,815 B2 * | 1/2013 | Benkley ............. G06K 9/00026 382/124 |
| 8,421,890 B2 | 4/2013 | Benkley, III |
| 8,564,314 B2 | 10/2013 | Shaikh et al. |
| 8,860,683 B2 | 10/2014 | Baumbach |
| 9,135,495 B1 | 9/2015 | Pope et al. |
| 9,153,490 B2 | 10/2015 | Mitushashi et al. |
| 9,177,191 B2 | 11/2015 | Benkley |
| 2003/0161511 A1 | 8/2003 | Vermesan et al. |
| 2005/0101054 A1 | 5/2005 | Mastromatteo et al. |
| 2005/0156906 A1 | 7/2005 | Chiu et al. |
| 2006/0056663 A1 * | 3/2006 | Call ....................... B60R 25/25 382/115 |
| 2006/0097991 A1 | 5/2006 | Hotelling et al. |
| 2006/0119369 A1 | 6/2006 | Kawahata et al. |
| 2008/0002867 A1 | 1/2008 | Mathiassen et al. |
| 2010/0176271 A1 | 7/2010 | Rim et al. |
| 2011/0019373 A1 | 1/2011 | Ryhänen et al. |
| 2011/0102569 A1 | 5/2011 | Erhart |
| 2011/0182488 A1 | 7/2011 | Bredholt et al. |
| 2011/0192657 A1 | 8/2011 | Chen et al. |
| 2011/0267298 A1 | 11/2011 | Erhart et al. |
| 2012/0134549 A1 | 5/2012 | Benkley, III |
| 2012/0242635 A1 | 9/2012 | Erhart et al. |
| 2012/0267740 A1 | 10/2012 | Okamoto |
| 2013/0181949 A1 | 7/2013 | Setlak |
| 2013/0194071 A1 | 8/2013 | Sløgedal et al. |
| 2013/0279769 A1 | 10/2013 | Benkley, III et al. |
| 2014/0241595 A1 | 8/2014 | Bernstein et al. |
| 2014/0361395 A1 | 12/2014 | Bhagavat et al. |
| 2015/0036065 A1 | 2/2015 | Yousefpor et al. |

FOREIGN PATENT DOCUMENTS

| | | |
|---|---|---|
| EP | 0902387 A2 | 3/1999 |
| EP | 0988614 B1 | 9/2004 |
| EP | 1328919 B1 | 1/2007 |
| EP | 1775674 A1 | 4/2007 |
| EP | 1303828 B1 | 1/2008 |
| JP | 63-310087 A | 12/1988 |
| JP | 04104377 A | 4/1992 |
| JP | 6-288852 A | 10/1994 |
| JP | 8-235361 A | 9/1996 |
| JP | 10-91769 A | 4/1998 |
| JP | 11-19070 A | 1/1999 |
| JP | 11-164824 A | 6/1999 |
| JP | 11-318864 A | 11/1999 |
| JP | 2001-141411 A | 5/2001 |
| JP | 2001-208509 A | 8/2001 |
| JP | 2001-1339057 A | 12/2001 |
| JP | 2002-502520 A | 1/2002 |
| JP | 2005156291 A | 6/2005 |
| JP | 2012-083829 A | 4/2012 |
| KR | 20080035133 A | 4/2008 |
| TW | 201229852 A1 | 7/2012 |
| TW | 201346779 A | 11/2013 |
| WO | WO 94/25938 A1 | 11/1994 |
| WO | WO 9852157 A1 | 11/1998 |
| WO | WO 9858342 A1 | 12/1998 |
| WO | WO 0199035 A2 | 12/2001 |
| WO | WO 0199035 A3 | 12/2001 |
| WO | WO 0199036 A3 | 12/2001 |
| WO | WO 03049012 A2 | 6/2003 |
| WO | WO 2004098083 A1 | 11/2004 |
| WO | 2011080262 A1 | 7/2011 |
| WO | WO 2011080262 A1 | 7/2011 |
| WO | WO 2013058464 A1 | 4/2013 |
| WO | WO 2014128249 A1 | 8/2014 |
| WO | WO 2014128260 A1 | 8/2014 |

OTHER PUBLICATIONS

International Search Report issued in International Patent Application No. PCT/EP20014/053403, 3 pages (Jun. 25, 2014).

Search Report issued in Norwegian Patent Application No. 20130289, 2 pages (Sep. 19, 2013).

Ratha, N., Bolle, R., "Automatic Fingerprint Recognition Systems," Springer-Verlag New York, Inc., ISBN 0-387-95593-3, New York, NY, 31 pages (2004).

Third Party Submission filed in U.S. Appl. No. 14/451,076, 22 pages (Jul. 31, 2015).

Third Party Submission as filed in U.S. Appl. No. 14/294,903, 15 pages (Jun. 10, 2015).

Third Party Submission as filed in U.S. Appl. No. 14/294,903, 19 pages (Jun. 10, 2015).

International Search Report and Written Opinion issued in International Patent Application No. PCT/US2015/016576, 11 pages (Jun. 12, 2015).

Japanese Notice of Reasons for Rejection with English Translation of Japanese Application No. 2002-503803, 17 pages (Jul. 15, 2010).

International Search Report for PCT/NO01/00238, 4 pages (Jan. 9, 2002).

Balde et al., "Overview of Multichip Technology," Electronic Materials Handbook, ASM International, vol. 1, pp. 144-145, 297-305, 320-321, 438-442 (ISNBN 0-87170-285-1) (no date provided).

Baumgartner et al., "Advanced Multichip Module Technologies," Proceedings of the 9th European Hybrid Microelectronics Conference, ISHM, International Society for Hybrid Microelectronic, pp. 200-207 (Jun. 1993).

Drueke, "A Sealing Process for Printed-Through-Holes," Proceedings of the 9th European Hybrid Microelectronics Conference, ISHM, International Society for Hybrid Microelectronics, pp. 115-122 (Jun. 1993).

* cited by examiner

INTEGRATED FINGER PRINT SENSOR

CROSS REFERENCE OF RELATED APPLICATION

This application claims the benefit under 35 U.S.C. §119 of the filing date of Norwegian patent application No. NO 20130289 filed Feb. 22, 2013 and Norwegian patent application No. NO 20131423 filed Oct. 28, 2013, the disclosures of which are incorporated herein by reference.

FIELD OF THE INVENTION

This invention relates to a fingerprint sensor for integration in smart phones or similar device.

BACKGROUND OF INVENTION

Finger print sensors comprising electrodes for measuring characteristics in a finger surface are well known, e.g. EP0988614, U.S. Pat. Nos. 5,963,679 and 6,069,970 describe sensors based on different impedance or capacitance measurement principles with stripe shaped or matrix sensors comprising a number of individual sensor elements.

The sensor surfaces of current fingerprint sensors are in general not suitable for having extensive direct contact with the environment, and usually have to be provided with a housing protecting the circuits from humidity, wear, corrosion, chemical substances, electronic noise, mechanical influences, sun light electric discharges etc. U.S. Pat. No. 5,862,248 provides a possible solution to this problem, in which the circuit is enclosed in such a way that the finger is allowed to direct contact with the sensitive surface of the sensor through an opening in the top of the enclosure.

In many cases, this solution will not be sufficient to provide the required reliability. The materials (semiconductors, metal, dielectrics) being used on the surface of the integrated circuits are usually not sufficiently reliable to withstand exposure from the outer environment and contact with the finger over a longer period of time, and thus this solution will also lead to reliability problems. Another solution may be adding additional layers of metal and dielectrics on the chip surface, as described in U.S. Pat. No. 6,069,970. Adding thick dielectric layers, however, generally results in a degradation of the measurement signal and, hence, the performance of the fingerprint sensor. Such layers also tend to increase the production costs and create compatibility problems with the semiconductor process in general (related to processing temperature, varying dimensions due to temperature differences etc.). Yet another solution is described in EP1303828 routing the conductors through a substrate to the processor then being positioned safely on the other side of the substrate, inside the device.

Touch screen driven devices, such smart phones and tablet style personal computer devices, typically have a front surface where the display area is approaching 100% utilization and has very limited space available for for physical buttons or other user interaction devices outside the display area. US 2013/0181949 A1 discloses one possible implementation of a transparent fingerprint sensor overlaying the touch screen of a smart phone. U.S. Pat. No. 8,564,314 disclose another possible implementation of a fingerprint sensor integrated with a capacitive touch position sensor where the sensor is positioned under glass. However, the patent does not discuss or propose any solutions to overcome the severe degradation of the sensor performance caused by the thick protective cover glass.

SUMMARY OF THE INVENTION

A fingerprint sensor integrated in the glass of a touch screen device, such as mobile phone or a tablet style personal computer, especially for sensing through the front glass or protective covering of the touch screen device allows for a cost effective solution that protects the fingerprint sensor against the external environment, and a multiplicity of different design and ergonomics key design criteria for different handset manufacturers.

These objectives are obtained by providing a fingerprint sensor especially for integration in a device having an overlay made of an insulating material where the fingerprint sensor comprising a plurality of sensing elements positioned on a first side of the overlay, a plurality of probes positioned in a predetermined pattern defining a fingerprint sensing area on a second side of the overlay, the plurality of probes extending from the first side of the overlay at least partially through the overlay, and a plurality of conductor leads on the first side of the overlay interconnecting the plurality of probes with the plurality of sensing elements.

A further object of the present invention is to provide a fingerprint sensor system especially for integration in a device having an overlay made of an insulating material, where the fingerprint sensor system comprising a plurality of sensing elements positioned on a first side of the overlay, a plurality of probes positioned in a predetermined pattern defining a fingerprint sensing area on a second side of the overlay, the plurality of probes extending from the first side of the overlay at least partially through the overlay, a plurality of conductor leads on the first side of the overlay interconnecting the plurality of probes with the plurality of sensing elements, a plurality of amplifiers connected to the plurality of sensing elements, the number of amplifiers preferably being less than the number of sensing element, and an activation circuit connected to the plurality of sensing elements, the activation circuit being adapted to output at least one activation signal.

Yet further objects of the present invention are obtained as claimed by the attached claim set.

BRIEF DESCRIPTION OF THE DRAWINGS

The present invention will be described in more detail with reference to the accompanying drawings, illustrating the invention by way of example only.

DETAILED DESCRIPTION OF THE INVENTION

Figure 1:
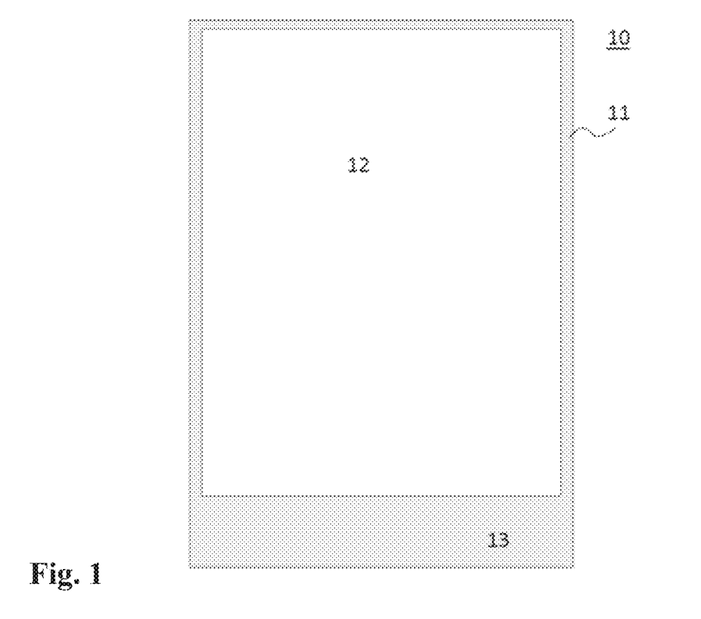
FIG. 1 illustrates an exemplary device including a fingerprint sensor according the present invention.

FIG. 1 illustrates a smart phone 10 having a front surface, 11 made of glass, PMMA (Poly methyl methacrylate), polycarbonate or other transparent glass equivalents, which, in the following, is referred to as glass. The front surface 11 is preferably the interface to a touch-screen enabled display as appreciated by those skilled in the art. The front surface 11 is typically made of one piece of glass and typically visually divided into a transparent section 12 and an opaque section 13, in the following referred to as the display 12 and button area 13, respectively. The smart phone 10, as appreciated by those skilled in the art, further includes a processor, a memory, a wireless transceiver, a touch screen driver and corresponding interconnecting circuitry. The fingerprint sensor described herein, depending on the requirements, could be positioned within the display area 12 or the button area 13, and could alternatively be connected to the touch screen driver as will be disclosed further in the following.

Figure 2:
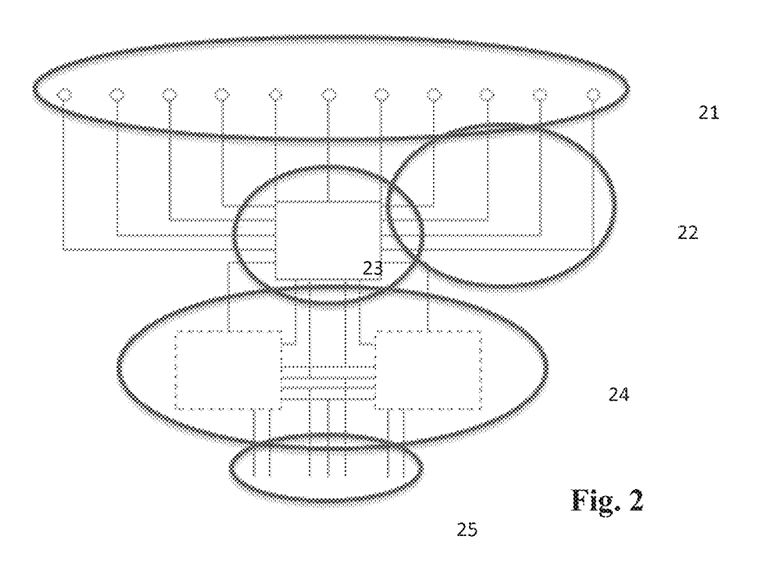
FIG. 2 illustrates an exemplary layout of the circuitry according to the present invention.

FIG. 2 illustrates a plurality of probes 21 positioned in a predetermined pattern defining a sensing area on the front side of the casing or overlay, e.g. glass, covering a device such as the smart phone exemplary illustrated in FIG. 1. Each of the plurality of probes 21 extends from the backside of the overlay at least partially through the overlay and is further coupled to a plurality of conductor leads 22 on the backside interconnecting the probes 21 with a plurality of sensing elements on the backside. The probes 21 provide electric coupling with a finger surface (not shown) positioned on the sensing area enabling the measuring of the fingerprint etc. according to different fingerprint measurement principles, such as capacitive or resistive measurement, as appreciated by the person skilled in the art.

The predetermined pattern defining the sensing area as shown in FIG. 2 is a simplified probe layout illustrative of the present invention. The fingerprint sensor as disclosed herein is not limited to any specific probe layout or sensing principle. In one exemplary embodiment of a stripe or swipe fingerprint sensor, a number of sensors elements would be employed for measuring the finger movement relative to the sensor as discussed in the abovementioned EP0988614 or EP1303828. Alternatively, the sensor may be a partial matrix sampling a sequence of images of the surface as in U.S. Pat. No. 6,289,114. Yet another probe layout is described in EP1328919 where two lines of sensor elements are used for measuring the movement of a finger for navigation purposes. In yet another embodiment of a touch sensor, the probes would be laid out as a matrix covering the complete, immobile fingerprint, as discussed in U.S. Pat. Nos. 6,512, 381, 6,862,942, 6,525,547 and 6,327,376.

FIGS. 3a-3d illustrate the cross-sections of exemplary embodiments of a fingerprint sensor integrated with an overlay 20 made of an insulating material, e.g. PMMA (Poly methyl methacrylate), polycarbonate or other transparent glass equivalents. A plurality of sensing elements 27 are positioned on a first side of the overlay 20. A sensing area is defined on a second side of the overlay 20 by probes 21 extending completely through the overlay 20 and/or probes 21' that extend only partially through the overlay 20, and the sensing area is connected to conductor leads 22 on the first side of the overlay. The conductor leads 22 constitutes a routing or redistribution layer routing signals from the probes 21, 21' to the plurality of sensing elements 27. The sensing elements are further connected to a signal processor (not shown), e.g. for analog signal conditioning, being positioned on the first side of the overlay. The signal processor may be a CMOS ASIC or any other suitable IC. It should however be noted that the conductor lead layer might be part of the sensing elements according to certain embodiments of the present invention. The probes 21, 21' and the conductor leads 22 are made of a conductive material and may be fashioned in such a way that small feature size or transparent materials such as Indium Tin Oxide (ITO) renders the conductors essentially invisible to the user. Hence, according to one exemplary embodiment of the present invention the probes 21, 21' are positioned in the transparent section 12 (see FIG. 1) of the overlay 20 and the conductor leads 22 are routed to a processing unit 23 (see FIG. 2) outside the transparent area.

An exemplary manufacture process of a fingerprint sensor as described herein takes advantage of commercially available cover materials and micro-machining processes. First, holes and/or blind holes are made in the substrate material to define the position and depth of the probes by methods known by the person skilled in the art such as laser drilling, mechanical drilling, ion drilling, ion etching etc. Secondly, the holes and surfaces are filled and/or covered by a conductive material by methods know by the person skilled in the art such as deposition, ion-exchange metallization etc. Thirdly, the electrodes and conductor leads might be processed partially on the front and/or back side of the substrate with standard lithography and etching processes as know by the person skilled in the art.

Now returning to FIG. 3a illustrating a first exemplary embodiment of a fingerprint sensor integrated with an overlay 20 made of an insulating material, such as glass. The probes 21 extend through the overlay and are essentially flush with the surface of the second side, or upper side, of the overlay 20. Depending on the chosen fingerprint sensing principle, in particular for capacitive sensing, a dielectric layer 31 might also cover the probes 21 to provide a capacitive coupling to the finger surface. The dielectric layer 31 may cover all or most of the probes 21. The uncovered probes 21 could provide a galvanic coupling to the finger surface.

Figure 3A:
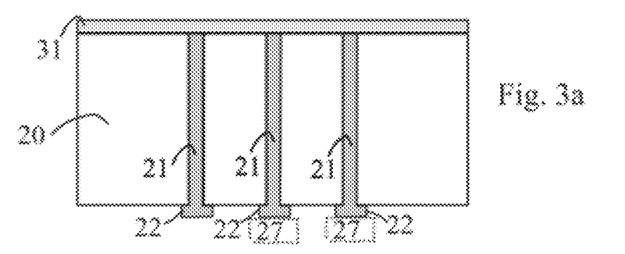
FIG. 3a-d illustrates cross sections of exemplary embodiments of a fingerprint sensor according to the present invention.
Figure 3B:
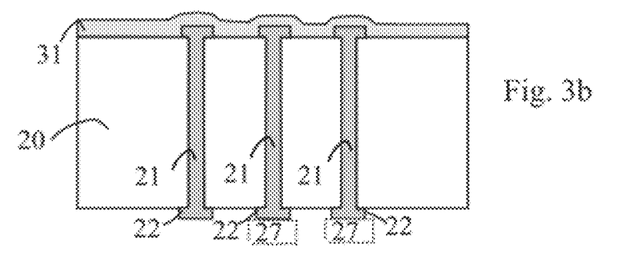

FIG. 3b illustrates a second exemplary embodiment of a fingerprint sensor integrated with an overlay 20 made of an insulating material, such as glass. The second embodiment differs from the first embodiment only in that the probes 21 extend over the upper side of the overlay 20. This allows for routing of the probes 21 on the upper side of the overlay. Again, depending on the chosen fingerprint sensing principle, in particular for capacitive sensing, a dielectric layer 31 might also cover the probes 21 to provide a capacitive coupling to the finger surface. The dielectric layer 31 may cover all or most of the probes 21. The uncovered probes 21 could provide a galvanic coupling to the finger surface. Although not shown, a combination of the two first embodiments is also possible, e.g. a plurality of the probes could be flush with the surface of the upper side of the overlay, while some probes could extend over the surface.

Figure 3C:
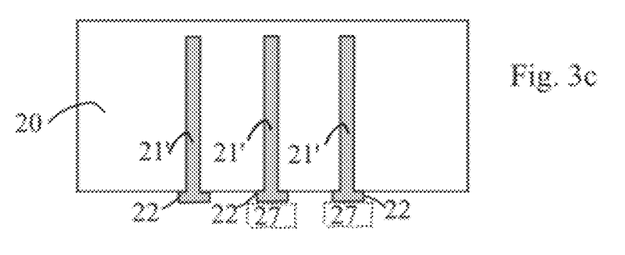
Figure 4A:
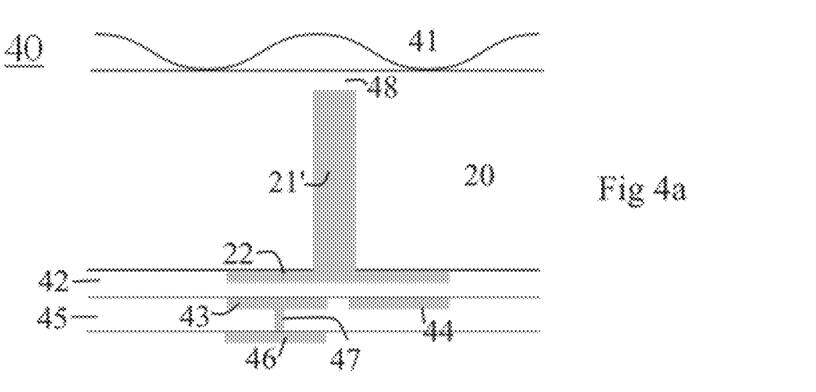
FIG. 4a-b illustrates one exemplary sensor element or sensor pixel of a finger print sensor according to the present invention.

FIG. 3c illustrates a third exemplary embodiment of a fingerprint sensor integrated with an overlay 20 made of an insulating material, such as glass. In this embodiment the probes 21' extend partially through the overlay 20. The distance $d_{21'}$ 48 (see FIG. 4) between the end of the each probe 21' and the surface of the upper side of the overlay 20 is chosen such that the probes 21' can provide a capacitive coupling to the finger surface. This allows for a fingerprint sensor using a capacitive sensing principle without the addition of a dielectric layer on top of the upper surface of the overlay 20.

Figure 3D:
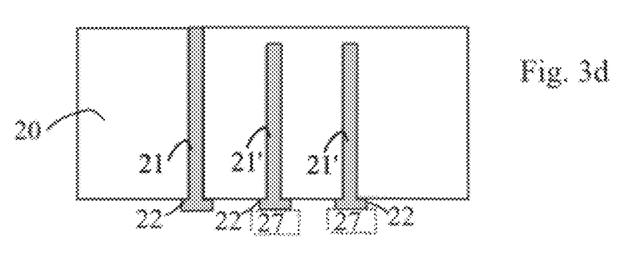

FIG. 3d illustrates a fourth exemplary embodiment of a fingerprint sensor integrated with an overlay 20 made of an insulating material, such as glass. In this embodiment there are probes 21' that extends partially through the overlay 20 and probes 21 that extends through the overlay 20. As described above with reference to FIG. 3c the distance $d_{21'}$ 48 between the end of each probe 21' and the surface of the upper side of the overlay 20 is chosen such that the probes 21' can provide a capacitive coupling to the finger surface. The probes 21 can provide a galvanic coupling to the finger surface. Although not shown, the probes 21 could also extend over the surface as described in further detail with reference to FIG. 3b above allowing for routing and probe structures on the upper side of the overlay 20.

The conductor leads 22 in one exemplary embodiment of the present invention comprise at least one conductive layer processed directly on the overlay 20 by applying and patterning the at least one layer of conductive material by methods known by the person skilled in art. The conductor leads might be used as a redistribution layer to fan out a typically very narrow pitch of the probes 21, 21' to ease the interconnect to a subsequent signal processing unit. In this way the redistribution layer also decouples the size of the subsequent signal processing unit from the size of the sensing area. Alternatively, the conductor leads 22 might be supplied with, e.g., BGA balls to interconnect to the subsequent signal processing unit. In yet another embodiment as described in further detail below with reference to FIGS. 4a and 4b the conductor leads are part of the sensing elements.

FIG. 4a illustrates one exemplary sensing element or sensor pixel 40 of a finger print sensor according to the present invention. The sensor element consist of the overlay 20 made of an insulating material, such as glass, and a probe 21' made of a conductive material extending from backside of the cover partially through the overlay 20. The probe 21' is connected to a conductor lead, or sensing electrode, 22 defined in a first conductive layer over a first dielectric layer 42. The sensing electrode 22 at least partially covers an activation electrode 43 and a pick-up electrode 44 defined in a second conductive layer on the opposite side of the first dielectric layer 42. The activation electrode 43 and the pick-up electrode 44 are defined in the same horizontal layer and made of a conductive material. The sensing element might also comprise a third conductor, or activation line, 46 defined in a third conductive layer positioned under the activation electrode 43 on the opposite side of a second dielectric layer 45. The activation line 46 is electrically connected to the activation electrode 43 either capacitively over the dielectric layer 45 or galvanically through a conductive via 47. It should be noted that the activation electrode 43 and pick-up electrode 44 might switch functionality based on a specific implementation.

In yet another exemplary embodiment the sensing element 40 is provided with a fourth conductive layer (not shown) positioned between the second and the third conductive layers. The fourth conductive layer will act as a shield layer between activation line 46 and pick-up electrodes 44.

Figure 4B:
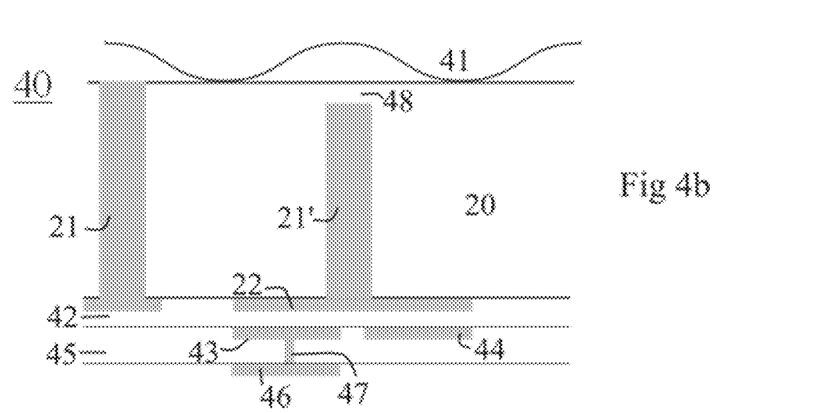

FIG. 4b illustrates an alternative embodiment of the fingerprint sensor in that the sensing element 40 further comprises a probe 21 made of a conductive material extending from the backside of and through the overlay 20. It is here shown one through-going probe 21 per sensor element or sensor pixel, however, it should be noted that the fingerprint sensor might only have one or only a few of these probes as applicable in a specific implementation.

Figure 5:
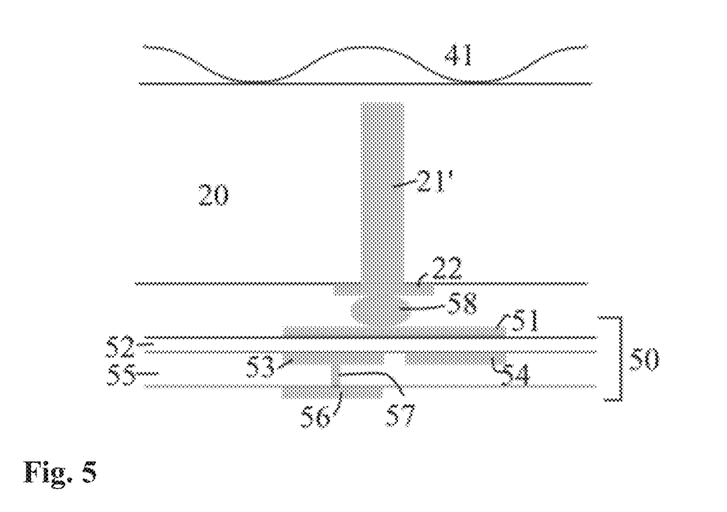
FIG. 5 illustrates another exemplary sensor element or sensor pixel of a finger print sensor according to the present invention.

In FIG. 5, an alternative embodiment of the present invention, a sensing element, or sensor pixel, 50 as described with reference to FIGS. 4a and 4b is made of a multi-layer polymer substrate using readily available technology, e.g. as disclosed in PCT/EP2010/070787. The polymer substrate is connected to the probe 21' and conductor lead 22 by way of readily available chip mounting techniques known to the person skilled in the art, as illustrated by bump bond 58. The sensing element 50 consist of a sensing electrode 51 defined in a first conductive layer over a first dielectric layer 52. The sensing electrode 51 at least partially covers an activation electrode 53 and a pick-up electrode 54 defined in a second conductive layer on the opposite side of the first dielectric layer 52. The activation electrode 53 and the pick-up electrode 54 are defined in the same horizontal layer and made of a conductive material.

The sensing element might also comprise a third conductor, or activation line, 56 defined in a third conductive layer positioned under the activation electrode 53 on the opposite side of a second dielectric layer 55. The activation line 56 is electrically connected to the activation electrode 53 either capacitively over the dielectric layer 55 or galvanically through a conductive via 57. It should be noted that the activation electrode 53 and pick-up electrode 54 might switch functionality based on a specific implementation. In yet another exemplary embodiment the sensing element 50 is provided with a fourth conductive layer (not shown) positioned between the second and the third conductive layer. The fourth conductive layer will act as a shield layer between activation line 56 and pick-up electrodes 54.

Figure 6:
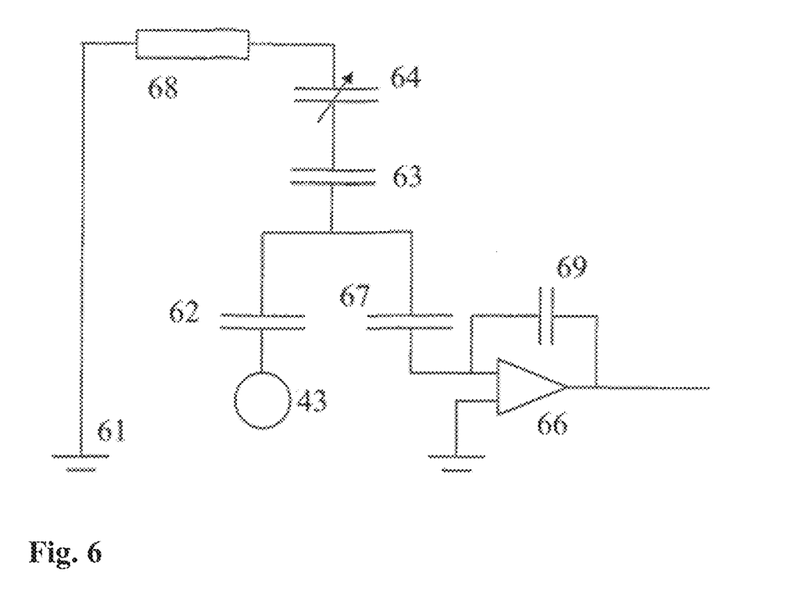
FIG. 6 is a schematic illustration of an exemplary measurement principle according to the present invention.

An exemplary measurement principle according to the present invention is illustrated in FIG. 6 with reference to FIGS. 2, 4a and 4b. A signal processing unit (for example signal processing unit 23 shown in FIG. 2), e.g. an ASIC, contains an amplifier 66 connected to the pick-up electrode (for example, pick-up electrode 44 as shown in FIGS. 4a and 4b) to amplify a signal therefrom, as well as other signal conditioning circuitry. An AC voltage signal from the activation electrode 43 couples to the sensing electrode (for example sensing electrode 22 as shown in FIGS. 4a, 4b). The input signal current to the amplifier 66 is determined by the capacitor 62 in series with the total capacitance from the end of the probe 21' to ground potential. The total capacitance is given by 67 in parallel with the series capacitance of 63 (through the sensor dielectric 48) and 64 (through the finger 41 ridge or through an air gap in a valley). The additional series impedance 68 through the finger to an external potential is for this discussion assumed negligible. Because all other elements are fixed, the magnitude of the input signal current will change dependent on the magnitude of the capacitance 64, which varies depending on whether there is a finger ridge or valley present over the probe 21'. The signal current can be amplified, filtered and demodulated (e.g. synchronously) by the ASIC. That is, when an AC voltage is applied to the activation electrode 43, there will be a capacitive flow of current from the activation electrode 43 to the pick-up electrode 44 through the sensor electrode 22. When there is an air-filled fingerprint valley situated directly above the probe 21', the impedance from the sensor element to an external potential 61 through the finger 41 will be practically infinite. On the other hand, when there is a fingerprint ridge present, there will be a much lower, finite impedance from the probe 21' to the external potential 61 through the finger 41. This will lead to a reduction of the signal current received at the pick-up electrode 44. This reduction in signal current will give rise to a signal contrast between ridges and valleys that may be visualized e.g. as a "greyscale" fingerprint image when the signals are amplified and digitized. The external potential 61 is, according to one exemplary embodiment of the present invention, capacitively or galvanically coupled to the finger 41 from a through-going probe 21. Alternatively, according to another exemplary embodiment of the present, the finger 41 is coupled to real ground through the human body.

Figure 7:
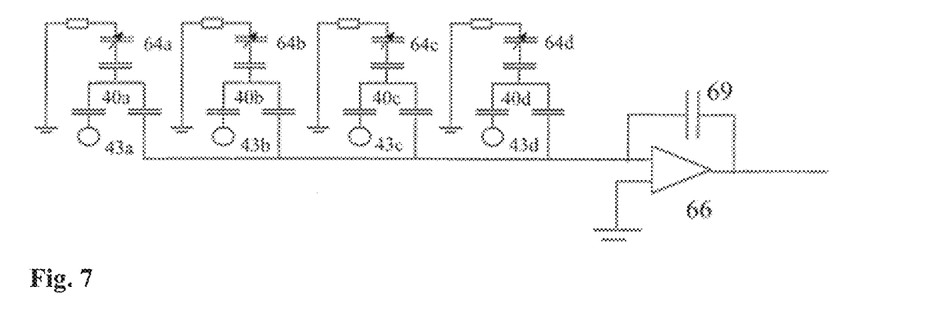
FIG. 7 is a schematic illustration of an exemplary measurement principle for an array of sensor elements according to the present invention.

FIG. 7 illustrates an array of sensing elements, or sensor pixels 40, according to the present invention where each of the sensing elements 40*a-d* is capacitively coupled to the same pick-up electrode (for example, pick-up electrode 44 as shown in FIGS. 4*a*, 4*b*). Each of the sensing elements may be activated by its associated activation electrode 43*a-d*. As can be seen from FIG. 7, if an activation electrode (e.g 43*a*) is left to float or held at a fixed potential, there will be practically no signal current to the pick-up electrode 44 from the corresponding sensing element 40*a*. This lack of signal current is regardless of whether there is a finger ridge or valley above the element 40*a*. This means that only those sensing elements 40 which are activated by an AC voltage will give rise to a response signal, specifically a signal current, that is modulated by the activation signal. The sensing elements 40 might be grouped in sets of sensing elements such that each sensing element in a set of sensing elements can be simultaneously activated by an activation signal common to all of the sensing elements in the set of sensing elements. This allows an effective passive multiplexing between different sensing elements 40 on a common pick-up line 44 using the activation electrode 43 signal as a combined activation and control signal. This passive multiplexing greatly reduces the size of the signal processing unit as additional active switches and associated control circuitry for each sensor element is not required.

Figure 8:
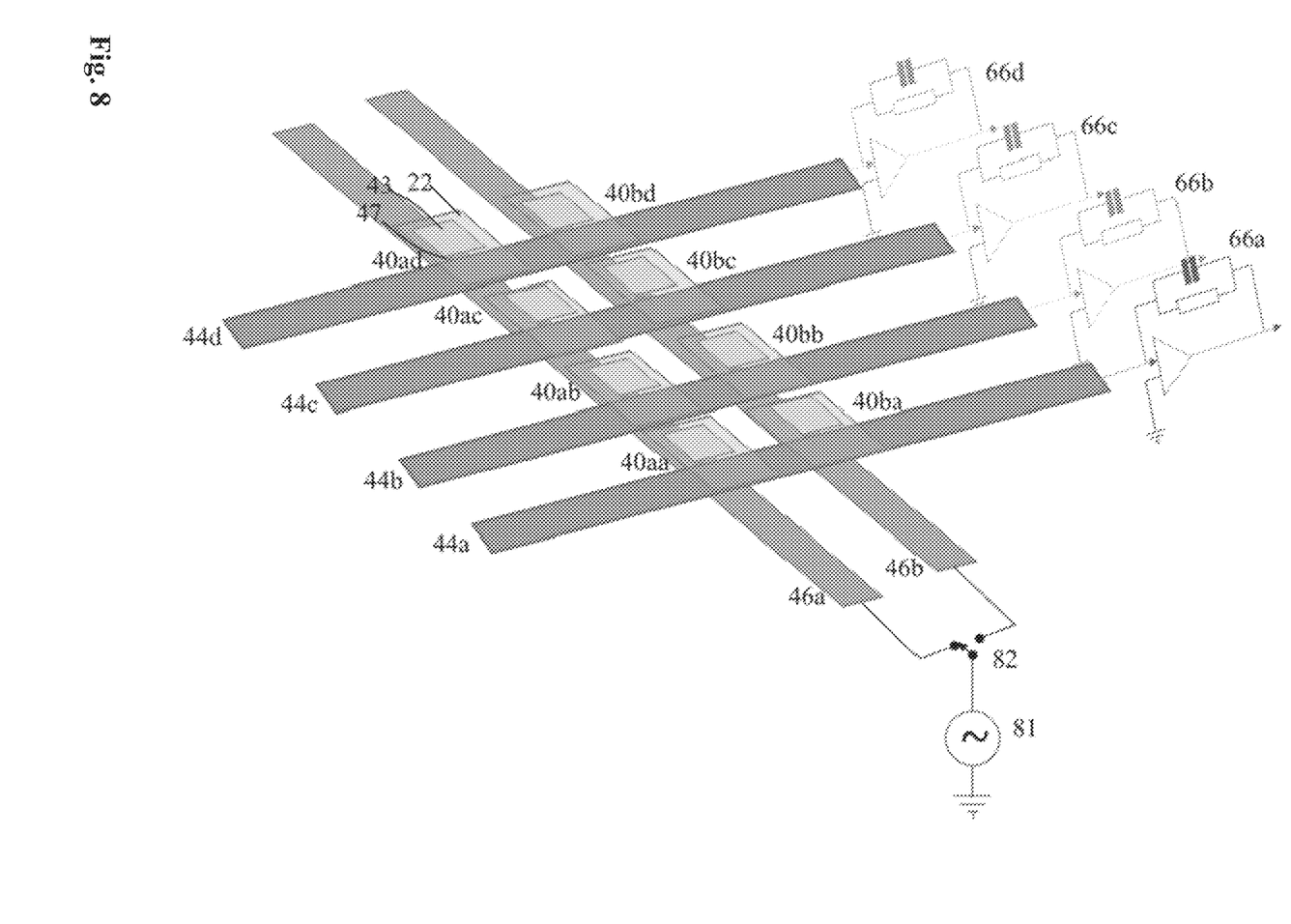
FIG. 8 is a schematic illustration of an exemplary fingerprint sensor system according to the present invention.

FIG. 8 is a schematic illustration of an exemplary embodiment of a fingerprint system according to the present invention. The fingerprint system comprises a plurality of probes (for example, probes 21' as shown in FIGS. 4*a*, 4*b*) positioned in a predetermined pattern defining a fingerprint sensing area on a second side of an overlay 20 made of an insulating material, such as glass, where the plurality of probes 21' extends from a first side of and at least partially through the overlay 20. A plurality of conductor leads (for example, conductor leads 22 as shown in FIGS. 4*a*, 4*b*) on the first side of the overlay 20 interconnects the plurality of probes 21' with a plurality of sensing elements 40 on the first side of the overlay.

FIG. 8 illustrates the plurality of sensing elements 40*aa*-40*bd* on the first side of the overlay and a plurality of amplifiers 66*a-d* connected to the plurality of sensing element, where the number of amplifiers 66*a-d* is less than the number of sensing elements 40*aa*-40*bd*. Also shown in FIG. 8 is an activation circuit 81 connected to the plurality of sensing elements 40*aa*-40*bd*, where the activation circuit 81 is adapted to output at least one activation signal. The sensing elements 40*aa*-40*bd*, the signal processing unit (for example, signal processing unit 23 as shown in FIG. 2) and associated interconnect circuitry might be arranged in a multitude of different configurations within the scope of the present invention, including, but not limited to, line sensor configurations, partial matrix sensor configurations and matrix configurations as discussed previously. The fingerprint sensor shown in FIG. 8 consist, for simplicity of the specification, of a 2×4 matrix of sensing elements 40*aa*-40*bd* and a signal processing unit with four amplifiers 66*a-d* connected to four pick-up electrodes 44*a-d*, respectively, and activation circuitry to feed the activation electrodes 43. However, the matrix may take any size and form, e.g. 1×n and m×n. The activation circuitry may for instance as illustrated have the form of an AC drive circuit 81 coupled to m output channels through a multiplexer 82. The schematic illustration of FIG. 8 includes m=2 drive lines 46*a-b* connecting the activation electrodes 43 to the AC drive circuit through the vias 47. The AC drive circuit 81 is connected to the drive line 46*a*, hence the sensing elements of that row (40*aa*, 40*ab*, 40*ac* and 40*ad*) are activated by the respective activation electrodes 43 and a resulting signal is sensed on the respective pick-up lines, or columns, 44*a-d* and amplified by the corresponding column amplifier 66*a-d*. Next the multiplexer 82 is sequentially switched and the AC drive circuit 81 is connected to the drive line 46*b*, the sensing elements of that row (40*ba*, 40*bb*, 40*bc* and 40*bd*) are activated by the respective activation electrodes 43, and a resulting signal is sensed on the respective pick-up lines, or columns, 44*a-d* and amplified by the corresponding column amplifier 66*a-d*.

The description above with reference to FIG. 8 describes a 1×n matrix of sensing elements where all of the sensing elements 40 in a row are connected to one drive circuit 81 through a common drive line 46. However, according to another exemplary embodiment of the present invention a linear array of sensing elements 40 is connected to a plurality of drive lines 46 to allow multiplexing of the pick-up electrodes 44 in a line sensor. In such a configuration, for example, drive line 46*a* could be connected to sensing elements 40*aa* and 40*ac* while drive line 46*b* could be connected to sensing elements 40*ab* and 40*ad*. In yet another linear array configuration according to the present invention, the drive line 46 is defined in the same horizontal layer as the activation electrode 43 and pick-up electrode 44, i.e. the second conductive layer, hence eliminating the third conductive layer.

Figure 9:
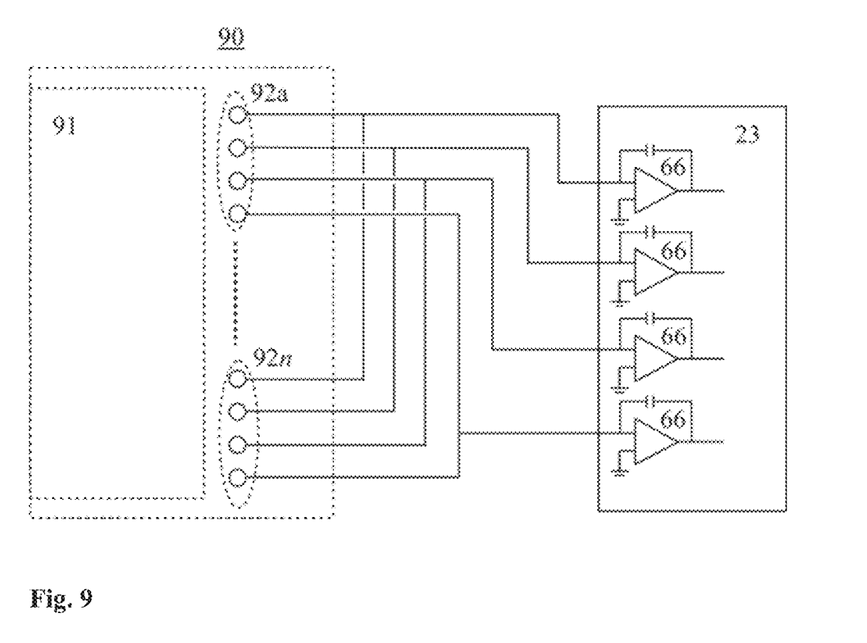
FIG. 9 is a schematic illustration another exemplary fingerprint sensor system according to the present invention.

FIG. 9 illustrates another exemplary embodiment of a fingerprint sensor system according to the present invention. The fingerprint sensor 90 consist of an essentially linear array of sensing elements (for example, sensing elements 40 as shown in FIGS. 4*a* and 4*b*), where the linear array essentially stretches the width of a touch screen device 91. The sensing elements are organized in a plurality of groups of sensing elements 92*a-*92*n*, where each group essentially defines a swipe fingerprint sensor. The activation electrode (for example, activation electrode 43 as shown in FIGS. 4*a* and 4*b*) of each sensing element in a group 92 is connected to a common drive line, while the pick-up electrodes (for example, pick-up electrodes 44 as shown in FIGS. 4*a* and 4*b*) of each sensing element in a group is routed to a column of amplifiers 66 in a signal processing unit 23. The column of amplifiers 66 in the signal processing unit 23 is common for each of the group of sensing elements 92. Hence, the fingerprint sensor 90 consist of a plurality of multiplexed or switched swipe fingerprint sensors. In one exemplary embodiment, this allows for measurement of a plurality of fingers in parallel. In another exemplary embodiment the signal processing unit 23 also receives input from the touch-enabled display, such as finger speed and/or direction, allowing the signal processing unit 23 to activate the appropriate group of sensor elements 92.

The unit may also include optional silicon dies and circuitry 24 (see FIG. 2) for secure biometric authentication. Typical options include microcontrollers for running biometric algorithms and communication and other functions requiring logic processing, various secure elements and USIM chips for authorizing financial transactions or service provider identification, as well as NFC controllers for radio frequency communication.

As illustrated in FIG. 2, the unit also may include an interface 25 to other parts of the smart phone or external connectors and equipment. An antenna (not shown) is also possible to integrate in combination with an NFC controller.

Figure 10:
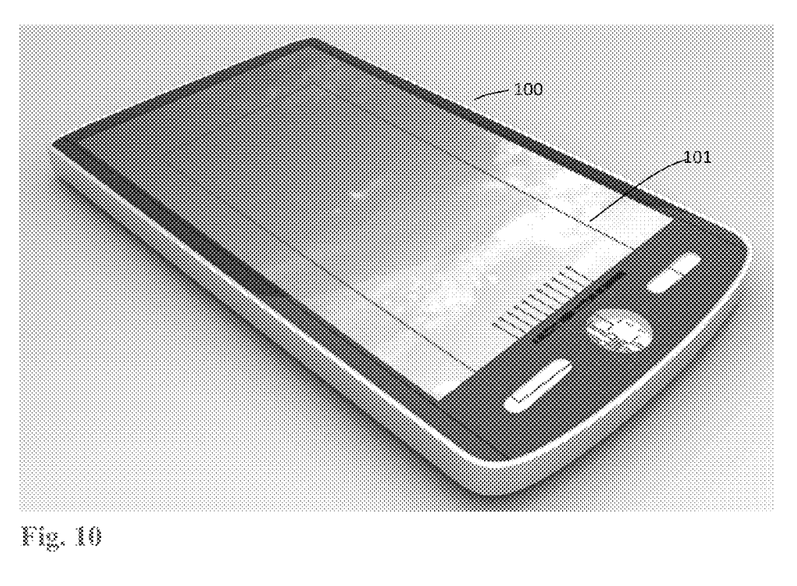
FIG. 10 illustrates an exemplary embodiment of the invention implemented into a smart phone.

Thus is possible to integrate a fingerprint sensor in the shell of a touch-screen device, such as a mobile phone or tablet style personal computer, while taking into account design and ergonomics considerations that are key design criteria for handset manufacturers. This will provide additional advantages such as:

Design
Ergonomics and usability
Simplified integration and enhanced durability
User feedback for increased biometric performance
Direct interaction with application graphics and animations FIG. 10 illustrates a smart phone 100 where the unit according to the invention is implemented in a phone using standard smartcard controllers and NFC chip set with antenna and combined to emulate an autonomous, biometric, standard EMV card in the cover glass 101.

The invention claimed is:

1. A fingerprint sensor configured for integration in a device having an overlay made of an insulating material, the fingerprint sensor comprising:
    a plurality of sensing elements positioned on a first side of the overlay, wherein the plurality of sensing elements comprises:
        a sensing electrode defined in a first conductive layer;
        a first dielectric layer under the sensing electrode; and
        an activation electrode and a pick-up electrode defined in a second conductive layer on the opposite side of the first dielectric layer from the sensing electrode, wherein the activation electrode and the pick-up electrode are at least partially covered by the sensing electrode;
    a plurality of probes defining a fingerprint sensing area on a second side of the overlay, the plurality of probes extending from the first side of the overlay at least partially through the overlay; and
    a plurality of conductor leads on the first side of the overlay interconnecting the plurality of probes with the plurality of sensing elements.

2. The fingerprint sensor according to claim 1, wherein all of the plurality of probes extend partially through the overlay.

3. The fingerprint sensor according to claim 1, wherein each probe of a first number of the plurality of probes extends partially through the overlay; and
    each probe of a second number of the plurality of probes extends through the overlay.

4. The fingerprint sensor according to claim 1, wherein each probe of a number of the plurality of probes extends through the overlay; and
    at least one of the portion of probes extending through the overlay is covered with a dielectric layer.

5. The fingerprint sensor according to claim 1, wherein the insulating material is selected from a group consisting of glass, Poly methyl methacrylate and polycarbonate.

6. The fingerprint sensor according to claim 1, wherein each sensing element is configured to be activated by an activation signal comprising an alternating current or voltage signal, and output a response signal modulated by the activation signal when activated.

7. The fingerprint sensor according to claim 6, wherein the sensing elements are grouped in sets of sensing elements, and each sensing element in a set of sensing elements is adapted to be simultaneously activated by an activation signal common to all of the sensing elements in the set of sensing elements.

8. The fingerprint sensor according to claim 1, wherein the first conductive layer is defined in a conductor lead layer on a first side of the overlay.

9. The fingerprint sensor according to claim 8, wherein the plurality of sensing elements is positioned on a substrate that is separate from the overlay and is electrically connected to the conductor lead layer on the first side of the overlay.

10. The fingerprint sensor according to claim 9, wherein the separate substrate is a multi-layer polymer substrate.

11. The fingerprint sensor according to claim 1, wherein the plurality of sensing elements further comprises:
    a second dielectric layer under the second conductive layer; and
    an activation line defined in a third conductive layer on an opposite side of the second dielectric layer from the second conductive layer, wherein the activation line is electrically connected to the activation electrode.

12. The fingerprint sensor according to claim 11, wherein the activation line is electrically connected to the activation electrode through a conductive via.

13. The fingerprint sensor according to claim 11, wherein the activation line is electrically connected to the activation electrode by way of capacitive coupling over the second dielectric layer.

14. The fingerprint sensor according to claim 1, wherein the probes are positioned in a transparent section of the overlay, the conductor leads are routed to a processing unit outside the transparent area, and the probes and the conductor leads are made of an essentially transparent material.

15. A fingerprint sensor system configured for integration in a device having an overlay made of an insulating material, the fingerprint sensor system comprising:
    a plurality of sensing elements positioned on a first side of the overlay;
    a plurality of probes defining a fingerprint sensing area on a second side of the overlay, the plurality of probes extending from the first side of the overlay at least partially through the overlay;
    a plurality of conductor leads on the first side of the overlay interconnecting the plurality of probes with the plurality of sensing elements;
    a plurality of amplifiers connected to the plurality of sensing elements, the number of amplifiers being less than the number of sensing elements; and
    an activation circuit connected to the plurality of sensing elements, the activation circuit being adapted to output at least one activation signal, wherein the plurality of sensing elements further comprises:
    a sensing electrode defined in a first conductive layer;
    a first dielectric layer under the sensing electrode;
    an activation electrode and a pick-up electrode defined in a second conductive layer on an opposite side of the first dielectric layer from the first conductive layer, wherein the activation electrode and the pick-up electrode are at least partially covered by the sensing electrode;

wherein the activation electrode is connected to the activation circuit; and wherein the pick-up electrode is connected to one of the plurality of amplifiers.

16. The fingerprint sensor system according to claim 15, wherein each sensing element is adapted to be activated by an activation signal comprising an alternating current or voltage signal from the activation circuit, and when activated, output a response signal modulated by the activation signal to one of the plurality of amplifiers.

17. The fingerprint sensor system according to claim 16, wherein the sensing elements are grouped in sets of sensing elements, and each sensing element in a set of sensing elements is adapted to be simultaneously activated by an activation signal from the activation circuit common to all of the sensing elements in the set of sensing elements.

18. The fingerprint sensor system according to claim 17, wherein the activation circuit is further adapted to
to sequentially switch the activation signal to activate one of the set of sensing elements at one time.

19. The fingerprint sensor system according to claim 15, wherein the plurality of sensing elements further comprise:
a second dielectric layer under the second conductive layer; and
an activation line defined in a third conductive layer on an opposite side of the second dielectric layer from the second conductive layer, wherein the activation line is electrically connected to the activation electrode such that the activation electrode is connected to the activation circuit through the activation line.

20. The fingerprint sensor system according to claim 15, wherein
the plurality of probes is arranged in a one or two-dimensional pattern, the two-dimensional pattern corresponding to m rows of sensing elements and n columns of sensing elements, where m≥1 and n>1;
the pick-up electrode of each sensing element in a column is connected to one of n amplifiers through a common pick-up line;

the activation electrode of each sensing element in a row is connected to an activation signal through a common activation line; and the activation circuit is configured to sequentially switch the activation signal to activate each of the sensing elements in a row such that a resulting signal is sensed on the respective pick-up electrode and amplified by the respective column amplifier.

21. The fingerprint sensor system according to claim 17, wherein the sets of sensing elements are arranged in an essentially linear array, each set of sensing elements essentially defining a swipe fingerprint sensor.

22. The fingerprint sensor system according to claim 21, wherein the activation circuit is further adapted to receive input from the touch-enabled display; and the activation circuit activates one of the sets of sensing elements based on the input from the touch-enabled display.

23. The fingerprint sensor system according to claim 22, wherein the input from the touch-enabled display includes the speed and direction of a finger moving over the touch-enabled display.

24. The finger print sensor of claim 1, wherein the plurality of sensing elements comprises:
two or more drive lines disposed in a side-by-side arrangement, and
two or more pickup elements disposed in a side-by-side arrangement and oriented transversely to said drive lines.

25. The finger print sensor system of claim 15, wherein the plurality of sensing elements comprises:
two or more drive lines disposed in a side-by-side arrangement, and
two or more pickup elements disposed in a side-by-side arrangement and oriented transversely to said drive lines.

* * * * *